United States Patent [19]

Wiltshire

[11] Patent Number: 5,313,562
[45] Date of Patent: May 17, 1994

[54] OPTICAL DEVICE WITH ELECTRODES END-TO-END WITH ELECTRIC FIELD CAUSING HOMEOTROPIC ALIGNMENT OF LIQUID CRYSTAL IN SPACE BETWEEN ENDS

[75] Inventor: Michael C. K. Wiltshire, Buckinghamshire, England

[73] Assignee: GEC-Marconi Limited, England

[21] Appl. No.: 872,891

[22] Filed: Apr. 23, 1992

[30] Foreign Application Priority Data

Apr. 24, 1991 [GB] United Kingdom ............... 9108834

[51] Int. Cl.[5] ................ G02F 1/1337; G02F 1/1343; G02F 1/137
[52] U.S. Cl. ...................................... 359/77; 359/87; 359/89; 359/93
[58] Field of Search ................ 359/77, 93, 89, 87

[56] References Cited

U.S. PATENT DOCUMENTS

| | | | |
|---|---|---|---|
| 3,807,831 | 4/1974 | Soref | 359/87 |
| 4,291,307 | 9/1981 | Peelle et al. | 359/89 |
| 4,496,220 | 1/1985 | Goscianski | 359/77 |
| 4,889,412 | 12/1989 | Clerc et al. | 359/93 |
| 4,948,232 | 8/1990 | Lange | 359/89 |
| 5,084,778 | 1/1992 | DeJule et al. | 359/89 |
| 5,103,329 | 4/1992 | Clark et al. | 359/89 |
| 5,136,407 | 8/1992 | Clerc | 359/55 |
| 5,182,664 | 1/1993 | Clerc | 359/77 |
| 5,229,873 | 7/1993 | Hirose et al. | 359/87 |

FOREIGN PATENT DOCUMENTS

| | | |
|---|---|---|
| 0045104 | 2/1982 | European Pat. Off. . |
| 0239433 | 9/1987 | European Pat. Off. . |
| 8702149 | 4/1987 | PCT Int'l Appl. . |
| 2076553 | 12/1981 | United Kingdom ............... 359/77 |
| 2202643 | 9/1988 | United Kingdom . |

OTHER PUBLICATIONS

Polarization Control for Coherent Communications, *Journal of Lightwave Technology*, vol. 8, No. 3, Mar., 1990, Nigel G. Walker et al., pp. 438-458.

Primary Examiner—Anita P. Gross
Attorney, Agent, or Firm—Kirschstein et al.

[57] ABSTRACT

An electrically-controllable wave plate comprises a layer of liquid crystal material having positive dielectric anisotropy, the layer being contained between two transparent plates. An alignment layer is provided on each plate for causing homeotropic alignment of the LC molecules adjacent the plate. Electrodes are so positioned that they apply an electric field substantially along the plane of the LC layer so that the molecules acquire variable tilt through the thickness of the layer, resulting in birefringence of the layer. The wave plate may be used in a polarisation controller.

8 Claims, 3 Drawing Sheets

OPTICAL DEVICE WITH ELECTRODES END-TO-END WITH ELECTRIC FIELD CAUSING HOMEOTROPIC ALIGNMENT OF LIQUID CRYSTAL IN SPACE BETWEEN ENDS

BACKGROUND OF THE INVENTION

1. Field of the Invention

This invention relates to an optical device, and particularly to an electrically-controllable wave plate and to a polarisation controller including such wave plate.

2. Description of the Related Art

There are two classes of liquid crystal device (LCD) which can be used to control the state of polarisation of light transmitted through the device. Nematic LCDs possess an electrically-controllable birefringence $\Delta n$, and hence a retardation ($\delta$), with a fixed optic axis. Such devices have been exploited in a liquid crystal polarisation controller (LCPC) as described in British Patent Publication No. 2202643A. Due to their wavelength of operation-(1550 nm) and the dynamic range required for the retardation, these devices are relatively slow, with response times of several hundred milliseconds. Smectic LCDs, in particular those using chiral smectic A liquid crystal materials, may exhibit the electroclinic effect in which the optic axis of the LC layer rotates in response to the applied voltage. Such a device therefore exhibits a fixed retardation with an electrically-controllable orientation of optic axis. The electroclinic effect is very fast, with response times of only a few microseconds, but has very limited dynamic range and so is not a feasible basis for a useful polarisation controlling device.

The existing LCDs therefore have limitations on their use as polarisation controlling elements, because only either the birefringence or the optic axis orientation is controllable; the other is fixed during the fabrication of the device.

A polarisation controller should be endless, i.e. the device should not reach the limits of its range and require resetting. Clearly the electroclinic device in which the orientation of the optic axis is controlled does not meet this requirement, because of the limited angular range of the effect (typically ±15°).

The slow response of the nematic, electrically-controlled birefringence LCPC, mentioned above severely restricts its operation capability, and devices fifty to one hundred times faster are required.

SUMMARY OF THE INVENTION

It is an object of the present invention to provide an improved electrically-controllable liquid crystal wave plate suitable, in particular, for use in a polarisation controller.

According to the invention there is provided an electrically-controllable liquid crystal wave plate comprising a layer of liquid crystal material having positive dielectric anisotropy, the layer being contained between two transparent plates; a respective alignment layer on each plate for causing homeotropic alignment of the molecules of the liquid crystal material adjacent the respective plate; and electrode means electrically-energisable to apply an electric field substantially along the plane of the layer of liquid crystal material whereby the molecules acquire variable tilt through the thickness of the layer of liquid crystal material, resulting in birefringence of the layer.

Embodiments of the invention will now be described, by way of example, with reference to the accompanying drawings, in which

DETAILED DESCRIPTION OF THE PREFERRED EMBODIMENTS

Figure 1:
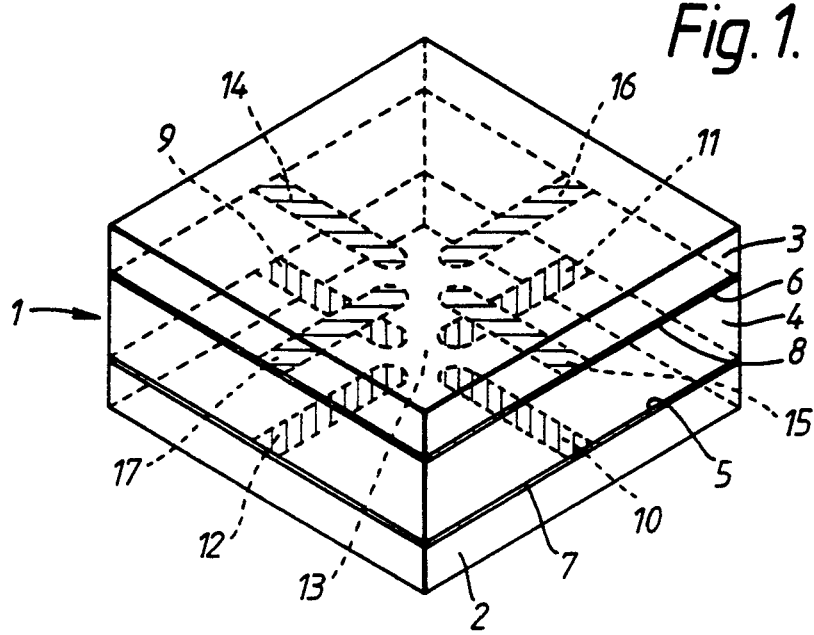
FIG. 1 is a schematic pictorial view of a liquid crystal cell forming a wave plate.

Referring to FIG. 1, a wave plate in accordance with the invention comprises a liquid crystal cell 1 comprising two glass plates 2,3, between which is sandwiched a thin layer 4 of liquid crystal material. The facing surfaces 5,6 of the glass plates are treated with respective alignment layers 7,8 for inducing homeotropic alignment of the liquid crystal material (i.e. the molecules align with their long axes perpendicular to the glass surface). Suitable alignment agents are, for example, an organo-silane such as octadecyltriethoxysilane, or a chrome complex such as tetrachloro-$\mu$-hydroxo-$\mu$-carboxylatodichromium III complex, both of which are well-known for producing homeotropic alignment in liquid crystals. The thickness of the liquid crystal layer is determined by spacers (not shown) and is selected to give a required range of optical properties as mentioned below. The cell is sealed around its edges by, for example, using an epoxy resin (not shown).

Figure 7:
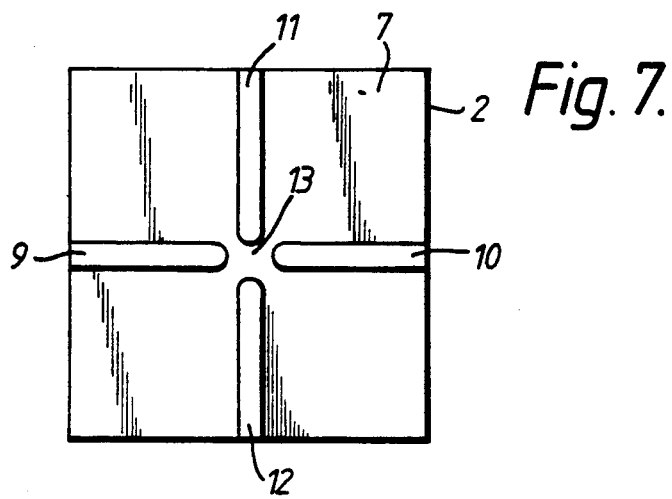
FIG. 7 is a schematic plan view of an electrode arrangement.

The cell 1 is provided with two orthogonal pairs of conductive strip electrodes 9,10 and 11,12, with a gap 13 between the inner ends of the electrodes (see also FIG. 7). These electrodes are provided on the surface 5 of the plate 2. A similar set of electrodes 14, 15 and 16,17 is provided on the surface 6 of the plate 3. The electrodes may be formed by depositing on the plates 2 and 3 conductive layers which are shaped into the electrode pairs either during or after deposition of the layers.

The electrodes in corresponding positions on the two plates, for example the electrodes 9 and 14, are interconnected, and control voltages are applied, as described below, between the electrodes of each pair. For example, a voltage of either polarity may be applied between the electrodes 9 and 10 (and hence also between the electrodes 14 and 15, and a voltage of different magnitude and/or polarity may be applied between the electrodes 11 and 12 (and hence between the electrodes 16,17).

It should be noted that the application of a voltage as just described will give rise to an electric field in the plane of the liquid crystal material. This is to be contrasted with the conventional configuration and mode of operation of a liquid crystal cell, in which the electrodes are arranged to generate an electric field across the thickness of the liquid crystal layer.

If there is zero voltage between the electrodes of each pair, the liquid crystal material in the gap 13 will be homeotropically aligned throughout, and will appear optically isotropic in that region in respect of light propagating in a direction normal to the liquid crystal layer.

Figure 2:
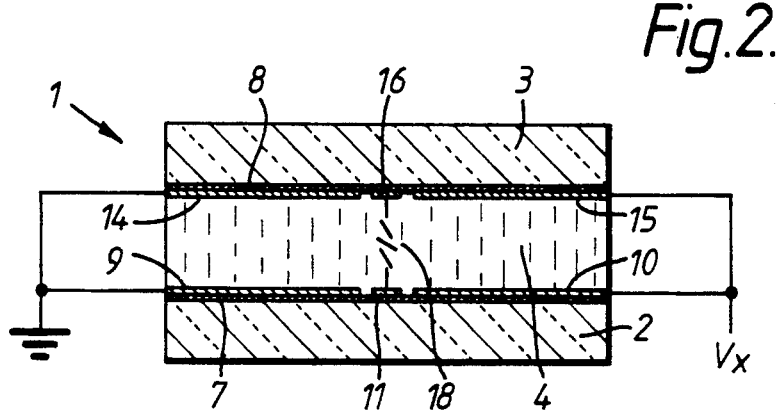
FIG. 2 is a schematic cross-sectional view of the cell of FIG. 1 with one form of electrode structure.
Figure 4:
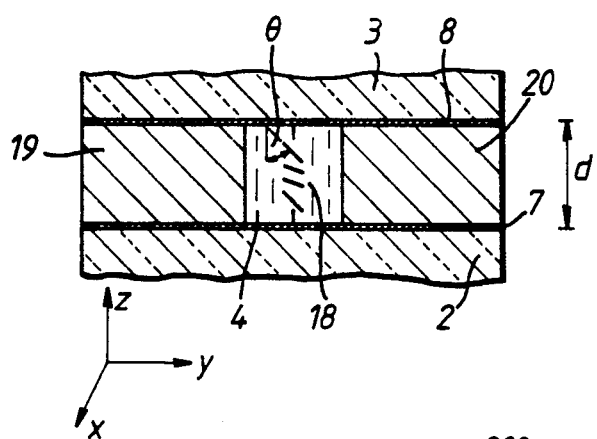
FIG. 4 is a diagram illustrating tilt angle $\theta$ of the liquid crystal molecules, FIG. 5 comprises a set of curves showing variation of tilt angle $\theta$ across the thickness of the liquid crystal cell for various values of applied voltage.
Figure 5:
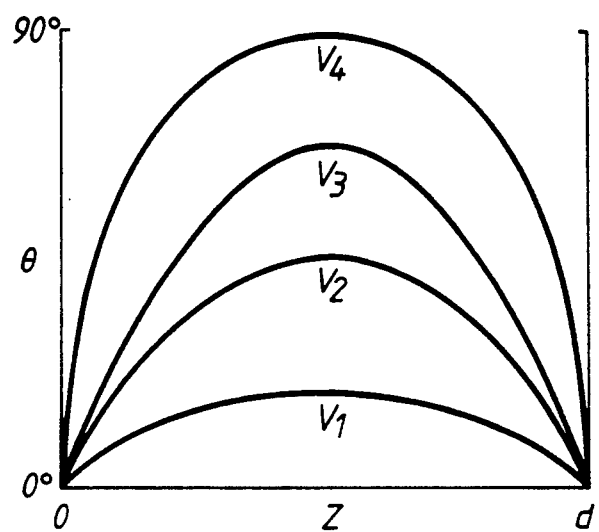
Figure 6:
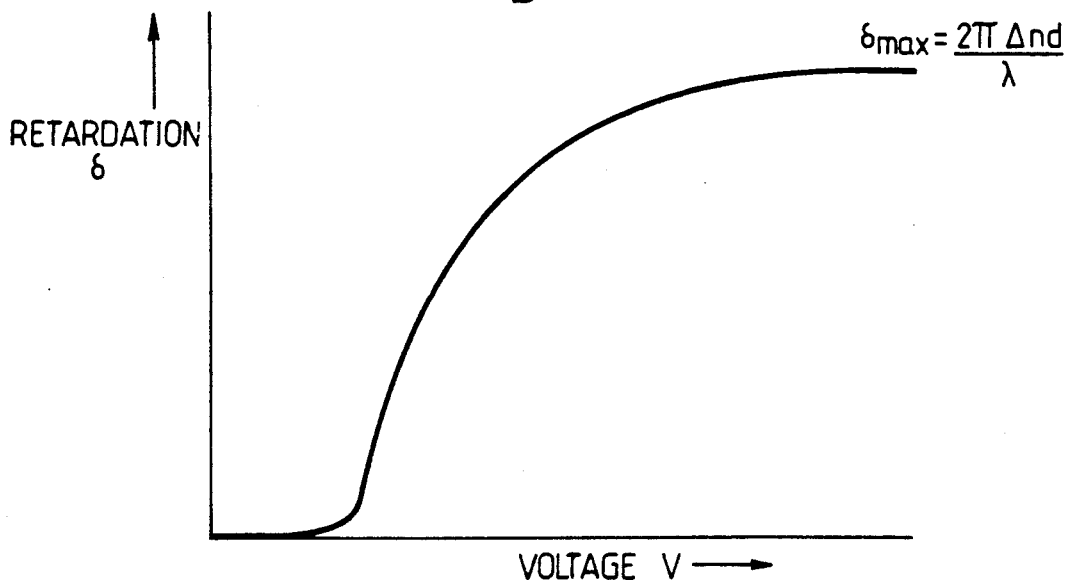
FIG. 6 is a curve of retardation against applied voltage for the cell.

The liquid crystal material is selected to have positive dielectric anisotropy. When a voltage is applied between the electrodes of a pair so than an electric field is applied along the plane of the liquid crystal layer 4, the molecules of the liquid crystal tend to align parallel to the field. However, the molecules adjacent the alignment layers 7,8 remain homeotropically aligned, so that a tilt profile, such as that illustrated schematically by a dotted line 18 in FIGS. 2 and 4, develops through the thickness of the cell. The liquid crystal layer 4 therefore exhibits birefringence, the magnitude of which depends upon the magnitude of the applied voltage. FIG. 5 shows a set of curves of molecule tilt angle $\theta$ against distance z through the thickness of the layer 4, the curves resulting from the application of respective voltages $V_1$-$V_4$, where $V_1 < V_2 < V_3 < V_4$. As the birefringence depends upon the applied voltage, the retardation caused by the device is electrically-controllable. The variation of retardation with applied voltage V is illustrated in FIG. 6.

Figure 8:
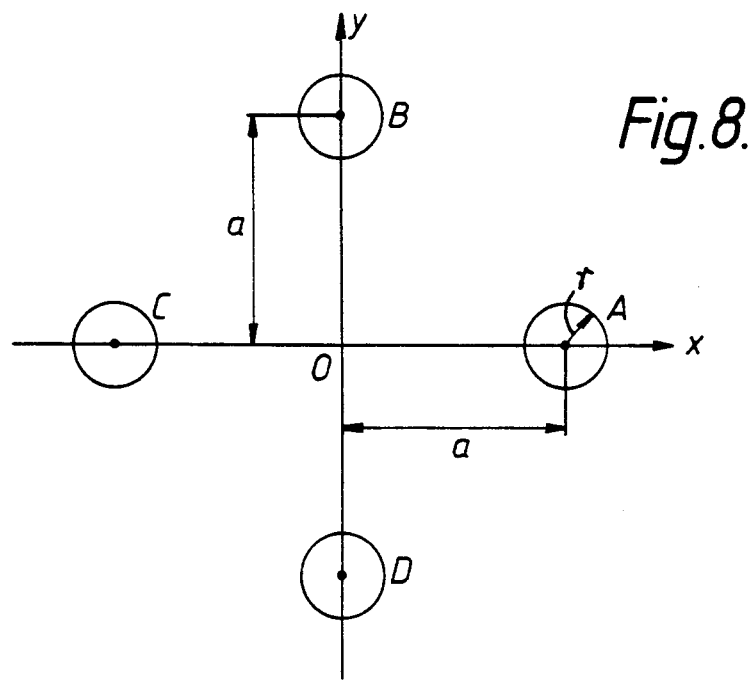
FIG. 8 illustrates a schematic electrode arrangement for calculation of electric field.

The optic axis of the electrically-induced birefringence lies in the direction of the electric field in the plane of the layer 4. Accordingly, if the further electrodes 11,12 of FIG. 7 are provided, and suitable potentials are applied to these electrodes, the direction of the optic axis can be independently controlled. For example, with the electrode configuration shown schematically in FIG. 8, if an alternating supply with an rms voltage $V_x = V_o \cos \theta$ is applied between electrodes A and C, and an rms voltage $V_y = V_o \sin \theta$ is applied between electrodes B and D, then, in the control region between the electrodes, the retardation of the liquid crystal will be governed by the size of $V_o$, and its direction $\theta$ will be given by $\tan \theta = V_y/V_x$. It will be apparent that this arrangement provides endless control of the angle $\theta$. Moreover, the control is continuous, because the surface alignment, being homeotropic, is rotationally degenerate so there are no favoured orientations for the liquid crystal in the plane.

The thickness of the liquid crystal layer 4 is chosen such that at the maximum value of $V_o$ the required fractional wave plate is obtained. For example, to obtain a half wave plate at 1550 nm, a value of $\Delta n.d = 775$ nm is required, which with $n = 0.19$ implies a layer thickness of 4 $\mu$m. Comparing this value with the thickness of 25 $\mu$m required for the existing LCPC, it can be seen that the response time, which is determined by the rotational viscosity and the square of the cell thickness (used to describe approximately all nematic LCDs), will be reduced by a factor of about 40. This will be reduced by a further factor of 4 if the device is required to act only as a rotatable quarter-wave plate.

Figure 3:
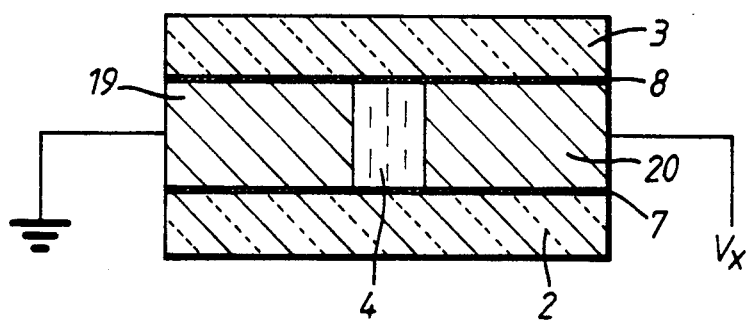
FIG. 3 is a schematic cross-sectional view of the cell with an alternative form of electrode structure.

Referring to FIG. 3 of the drawings, in an alternative configuration of the device the electrode layers on the plates 2 and 3 are replaced by four strips of conductive foil of substantially the same thickness as the liquid crystal layer 4, with the layer 4 confined to the gap between the ends of the strips. In FIG. 3 only two of the strips, namely strips 19 and 20, can be seen.

To investigate further the design and performance of a particular device, the following DC case will be considered. It should be remembered that liquid crystals respond to $V^2$, so this example serves only to illustrate the device concept. Take four circular electrodes A, B, C, D of radius r, with external connections made via negligibly thick conducting tracks symmetrically disposed on the x and y axes at ($\pm a$, 0) and (0, $\pm a$) (see FIG. 8) where $a > r$, and apply to each electrode a respective potential $V_A$, $V_B$, $V_C$ and $V_D$. Using the condition $a > r$, each electrode can first be treated independently and its effect represented by a point charge of magnitude $Q = 4\pi\epsilon\epsilon_0 rV$ where $\epsilon$ = relative permittivity of the surrounding medium, in this case the liquid crystal material. The dielectric anisotropy of the liquid crystal is ignored in this example. Using the point charges $Q_A$, $Q_B$, $Q_C$, $Q_D$, the potential at a point (xy) is given by, $$V(x,y) = \frac{Q_A}{[(a-x)^2 + y^2]^{\frac{1}{2}}} + \frac{Q_B}{[x^2 + (a-y)^2]^{\frac{1}{2}}} + \frac{Q_C}{[(a+x)^2 + y^2]^{\frac{1}{2}}} \frac{Q_D}{[x^2 + (a+y)^2]^{\frac{1}{2}}}$$

Within the central region between the electrodes where x,y < a, the field E = $-$grad V is calculated retaining terms in the potential up to $(x/a)^2$ and $(y/a)^2$. It is found that $$-E_x = \frac{Q_A - Q_C}{a^2} + \frac{x}{a^3}[5Q_A - Q_B + 5Q_C - Q_D]$$

$$-E_y = \frac{Q_B - Q_D}{a^2} + \frac{y}{a^3}[-Q_A + 5Q_B - Q_C + 5Q_D]$$

Selecting $$Q_A = -Q_C = Q_x \text{ and } Q_B = -Q_D = Q_y$$

$$E_x = -2Q_x/a^2 \quad E_y = -2Q_y/a^2$$

Hence, the field magnitude is $$|E| = 2(Q_x^2 + Q_y^2)^{\frac{1}{2}}/a^2 = 8\pi\epsilon\epsilon_0 r(V_x^2 + V_y^2)^{\frac{1}{2}}/a^2$$

Its direction is given by $$\tan \theta = Q_y/Q_x = V_y/V_x$$

Figure 9:
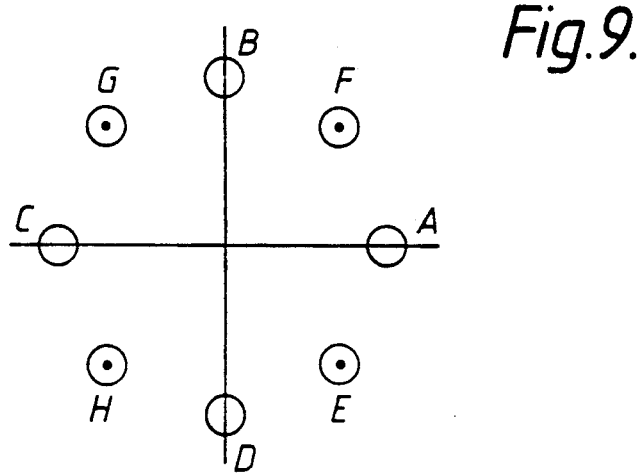
FIG. 9 illustrates schematically the addition of further electrodes.

In a practical example, a = 250 $\mu$m, r = 25 $\mu$m might be selected to provide a working region of diameter about 150 $\mu$m. This simple example has served to outline the working principle of the device; more rigorous proofs and alternative electrode designs will be apparent to those skilled in the art. In particular, as shown in FIG. 9, additional electrodes might be provided between the original four, or the shape of the electrodes might be adapted. From the above example, one class of electrode shapes is provided by the equipotential surfaces of the point charge distribution. Other families of electrode shapes can be derived from considering the design of electrostatic lenses.

A polarisation controller for use, for example, in coherent optical communications is required to convert a time-varying arbitrary state of polarisation to another, possibly time-varying, arbitrary state of polarisation without the need to reset the device, i.e. the control must be endless. As mentioned above, the nematic liquid crystal device of British Patent Publication No. 2,202,643A fulfils this function, but is relatively slow in operation.

The present device functions in a manner somewhat similar to a lithium niobate polarisation controller (see, for example, N G Walker and G R Walker, J Lightwave Technology 8 pp 438-58, 1990). However, the lithium niobate device has the disadvantage of requiring high voltages (up to 100 volts in some cases), exhibiting remanent birefringence when no driving voltage is applied, having a high insertion loss (typically 3-3.5 dB) and being expensive to produce. The present device requires lower voltages, has no birefringence when undriven, has a low insertion loss (<1.5 dB) and is cheap to manufacture.

In principle, endless control can be achieved with just a single device, provided that the rotardation range is $0 \geq 2\pi$. It may be preferable, however, to incorporate two devices, both having a retardation range of $0 = \pi$, to achieve robust endless polarisation control.

The operating speed of the device according to the invention might still not be adequate for use as a polarisation controller for some applications. This is because, when the required retardation is small, only low voltages are applied and the response times are therefore long. Rapid response can, however, be achieved in the following way. Instead of using one or two devices with both variable retardation and variable orientation, the liquid crystal polarisation controller is configured as a stack of wave-plates of rotatable optic axis but of fixed retardation. Possible examples are the sequences $\lambda/4, \lambda/2, \lambda/4$ where the optic axis is rotatable at each element, or $\lambda/2, \lambda/4, \lambda/2, \lambda/4, \lambda/2$ where the $\lambda/4$ elements are fixed and the optic axis at the $\lambda/2$ elements can be rotated. In either case, the cells of the present device can be constructed so that the required retardation ($\lambda/4$ or $\lambda/2$) is achieved at reasonably high voltage (say 10-15 volts rms). In this condition, the device will respond very rapidly to changes in orientation with response times as low as 1 msec.

When a liquid crystal polarisation controller is made using rotatable fractional wave plates, it is important that the plate be precisely $\lambda/2$ or $\lambda/4$ as required. Clearly this is difficult to achieve in any conventional way (for example fibre loops). The present device has the advantage that the $\lambda/4$ or $\lambda/2$ condition can be achieved very precisely by simply adjusting the magnitude of the drive voltage. In this way, a very flexible and rapid polarisation controller can be manufactured.

To summarise, in the liquid crystal wave plate device according to the invention the magnitude of the retardation and/or the direction of the optic axis are electrically controllable. The retardation is determined by the thickness of the liquid crystal layer and the voltage applied. The direction is controlled by the distribution of electric potential between a set of in-plane electrodes and is endlessly and continuously variable. The speed of the device is governed by the thickness of the cell and is comparable to that of any nematic liquid crystal device i.e. 5-50 msec. The device can be used, inter alia, for endless polarisation control. It is simple and inexpensive to produce, and exhibits low loss and rapid response.

I claim:

1. An electrically-controllable liquid crystal wave plate comprising a layer of liquid crystal material having positive dielectric anisotropy, the layer being contained between two transparent plates; a respective alignment layer on each plate for causing homeotropic alignment of the molecules of the liquid crystal material adjacent the respective plate; and electrode means electrically-energizable to apply an electric field in the layer of liquid crystal material whereby the molecules acquire variable tilt through the thickness of the layer of liquid crystal material, resulting in birefringence of the layer, wherein the electrode means comprises at least one pair of first conductors disposed end-to-end substantially in the plane of the layer of liquid crystal material with a space therebetween in which the electric field is generated.

2. A wave plate as claimed in claim 1, including at least one pair of end-to-end second conductors disposed orthogonally with respect to said pair of first conductors and with a space therebetween which is aligned with the space between said pair of first conductors.

3. A wave plate as claimed in claim 2, wherein each pair of conductors comprises two strips of electrically-conductive material of substantially the same thickness as the layer of liquid crystal material; and wherein the liquid crystal material is confined to said space between the conductor ends.

4. A wave plate as claimed in claim 2, wherein the second conductors comprise a pair of conductors on one of said plates and a correspondingly disposed pair of conductors on the other of said plates.

5. A wave plate as claimed in claim 1, wherein the first conductors comprise a pair of conductors on one of said plates and a correspondingly disposed pair of conductors on the other of said plates.

6. A wave plate as claimed in claim 1, wherein each alignment layer comprises a layer of an organo-silane.

7. A wave plate as claimed in claim 1, wherein each alignment layer comprises a layer of a chrome complex.

8. A polarisation controller assembly comprising a plurality of wave plates as claimed in claim 1, arranged so that light passes through the wave plates in sequence, the successive wave plates being energized to exhibit fixed retardation but rotatable optic axis.

* * * * *